(12) United States Patent
Lamb et al.

(10) Patent No.: US 8,117,264 B1
(45) Date of Patent: Feb. 14, 2012

(54) EMAIL SYSTEM

(75) Inventors: Iain K. Lamb, San Francisco, CA (US); Ethan H. Diamond, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2806 days.

(21) Appl. No.: 10/267,004

(22) Filed: Oct. 7, 2002

(51) Int. Cl.
*G06F 15/16* (2006.01)

(52) U.S. Cl. ......... 709/206; 709/203; 709/219; 719/318

(58) Field of Classification Search .................... 709/206
See application file for complete search history.

(56) References Cited

U.S. PATENT DOCUMENTS

| | | | |
|---|---|---|---|
| 6,460,058 B2 * | 10/2002 | Koppolu et al. ............... 715/738 |
| 6,658,453 B1 * | 12/2003 | Dattatri ......................... 709/202 |
| 6,944,555 B2 * | 9/2005 | Blackett et al. ................. 702/62 |
| 7,162,723 B2 * | 1/2007 | Guthrie et al. ................. 719/318 |
| 7,802,264 B2 * | 9/2010 | Robertson et al. ............. 709/215 |
| 2002/0120685 A1 * | 8/2002 | Srivastava et al. ............. 709/203 |
| 2002/0129096 A1 * | 9/2002 | Mansour et al. ............... 709/203 |
| 2002/0174260 A1 * | 11/2002 | Huang .......................... 709/313 |
| 2003/0172118 A1 * | 9/2003 | Bilansky et al. ............... 709/206 |
| 2007/0016639 A1 * | 1/2007 | Mukundan et al. ........... 709/203 |
| 2008/0216094 A1 * | 9/2008 | Anderson et al. ............. 719/318 |

OTHER PUBLICATIONS

IETF RFC RFC 2060—IMAP Ver4Rev1, Dec. 1996, M. Crispin, University of Washington.*

* cited by examiner

*Primary Examiner* — Greg C Bengzon
(74) *Attorney, Agent, or Firm* — Hickman Palermo Truong & Becker LLP (57) ABSTRACT

A system and method are disclosed for providing interaction with mail data on a server. Providing interaction with mail data on a server comprises receiving mail information from the server; updating data structures in a client using the mail information received; operating on the mail information at the client and displaying operation results on the client; sending operation information to the server so that the same operation may be executed on the server.

10 Claims, 7 Drawing Sheets

EMAIL SYSTEM

FIELD OF THE INVENTION

The present invention relates generally to electronic mail (email) systems. More specifically, a browser based email system is disclosed.

BACKGROUND OF THE INVENTION

Email has become a communications tool that is indispensable to many people today. Many popular desktop email systems, such as Outlook® and Eudora®, are designed for users to check their email from certain computers equipped with appropriate email client software. These types of software offer good performance, as the client applications are native applications of the computer's operating system. However, the users are not able to use email on a computer not properly configured with the right client software.

Gaining increased popularity are browser based email systems where a user uses a web browser to check his email over the world wide web, from any networked computer or electronic device. Since most computer systems today already have some form of web browser installed, no additional client application is needed. Using a browser, the user connects to a mail server via the Internet and carries out email activities. Most or all email data processing is done on the central mail server, while the browser acts as a "thin client" access point that primarily displays email data from the server. Examples of such email systems include Yahoo Mail and Hotmail. These systems are typically implemented using a request/response model, where every user request is transferred to the server as a hypertext markup language (HTML) FORM submission, using a hypertext transfer protocol (HTTP) POST or GET method. The server then replies with a response that includes a message in HTML format. For example, when the user clicks on a link representing the inbox, a POST request for the inbox information is sent to the server. The server then sends back a response that is an HTML page containing information about all the message headers in the inbox. The page is then displayed in the browser window.

Because the browser waits to receive the information from the server and then renders it, the user often experiences long latency while interacting with the system, i.e. the system appears slow and not responsive. The latency is attributed to the server response time and network delays. Also, when there are a lot of users on the same system, the server's response slows down and the network traffic increases, resulting in worse performance. Furthermore, any update in the appearance of the client application requires a new request to be sent to the server and another HTML page to be received from the server, adding more load to the server and the network. Due to latency concerns and the limitations of HTML, the user interface of these systems tends to be fairly minimalistic and does not support many of the advanced features found in desktop email applications.

It would be desirable to have a high performance, feature rich Internet based email system that eliminates the traditional request/response model in order to provide the user with faster responses and a highly improved user experience.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A system and method for high performance email over a network is disclosed. A client mail program associated with a browser connects to a server over a network to send and receive mail information. Such a system can be built by replacing the traditional "thin client" model described above with a "smart client" (a.k.a. "rich client") model. Using such an approach, the browser not only accesses and displays email, but also performs key email data processing tasks such as searching or sorting of email messages, email folder management, drag-and-drop of email messages, automatic completion of email addresses through address book lookup, and email message previews. This model employs an asynchronous communication protocol between the client and the server. As a result, the client does not need to wait for server responses and redraw the user interface every time the server sends new data to the client. Thus, a smart client based Internet mail system reduces the latency and unresponsiveness problems of traditional Internet based email systems while minimizing the high amount of request/response traffic between the client and the server.

Figure 1:
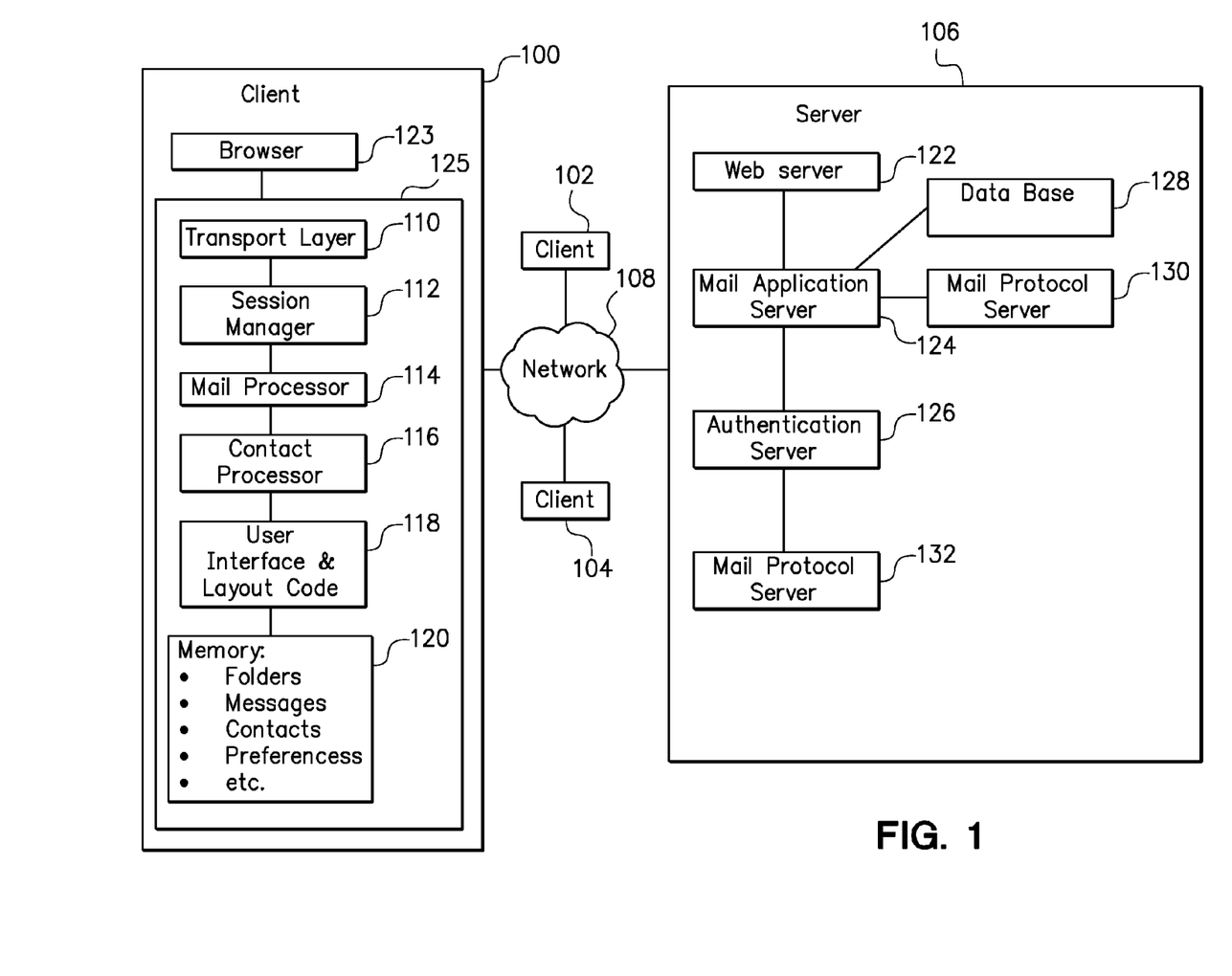
FIG. 1 is a block diagram illustrating one embodiment of the email system in accordance with the present invention.

FIG. 1 is a block diagram illustrating one embodiment of the email system in accordance with the present invention. Clients 100, 102 and 104 are connected to server 106 via network 108. The clients can be a variety of computers or electronic devices that have the capabilities to process data and connect to the server via a network. There can be a different number of clients in the system than the three shown in the diagram. A typical client such as client 100 comprises a browser 123 and a client mail program 125 that is associated with the browser. Examples of the browser include Internet Explorer®, and Netscape®, as well as other software capable of sending and receiving information from a server, processing and displaying the information received.

The client mail program is downloaded from the server to the user's computer when the user logs on. In one embodiment, the client mail program runs in the browser. In other embodiments, the client mail program runs outside the browser. The client mail program works in conjunction with the browser and leverages various capabilities built into the browser such as data storage and user interface.

In the embodiment shown, the client mail program is automatically loaded into the user's browser upon viewing a web page. It uses technology built into the browser to render the user interface and handle mail data. Client mail program 124 includes: a transport layer 110 that handles the communication between the client and the server; a session manager 112 that handles sending requests to and receiving responses from the server; a mail processor 114 that generates mail related data structures, based on information received from the server; a contact processor 116 that handles contact related data structures; user interface and layout code 118 that transforms data internal to the client code into HTML format to be rendered in the browser and memory 120 for storing data used by the client program, such as mail folders, messages, contacts, and preferences. In some embodiments, the client mail program includes additional components and the components on the client side form connections other than the ones shown in the diagram.

The software components on server 106 include: a web server 122 that handles communication between the server and the client; a mail application server 124 that processes mail related request from the client and sends the response to the client; an authentication server 126 that authenticates the user; a database 128 that stores user information such as contacts, calendar, etc. and mail protocol servers 130 and 132 for handling mail related functions using different mail protocols. In the embodiment shown, mail protocol server 130 is an Internet Message Access Protocol (IMAP) server, and mail protocol server 132 is a Simple Mail Transfer Protocol (SMTP) server.

The client is configured to receive from the server various mail related information such as message headers, message content and contact information. The received information is updated in the client's internal data structures and processed. The user interface and layout code renders the information accordingly. The user performs various operations to manipulate the mail information using the user interface. For instance, the user can move messages from one folder to another. Accordingly, the client updates its internal data structures to reflect the change, and update the display. The information relating to the operations is sent to the server, so that the server can carry out the same operation, and synchronize its data to reflect the changes that occurred on the client side. In some embodiments, data related to the state information of the client is sent to the server for the server to synchronize its data with the data on the client.

The client mail program is implemented using a programming language that allows for client side manipulation of data. Using the client to do much of the data processing and rendering minimizes communication with the server, and improves efficiency and performance. In one embodiment, the client mail program is implemented using Dynamic Hypertext Markup Language (DHTML), which is a mixture of different technologies including ECMAScript (commonly referred to as JavaScript, or Jscript), cascading style sheets (CSS), and the Document Object Model (DOM). DHTML allows a web page to change in appearance even after it has been loaded in the browser, and thereby reducing repeated update requests and responses between the client and the server. For the purposes of this specification, a DHTML based client mail program is discussed in detail. However, it should be noted that the architecture and techniques are equally applicable to browser-based mail programs implemented using other technologies.

Figure 2:
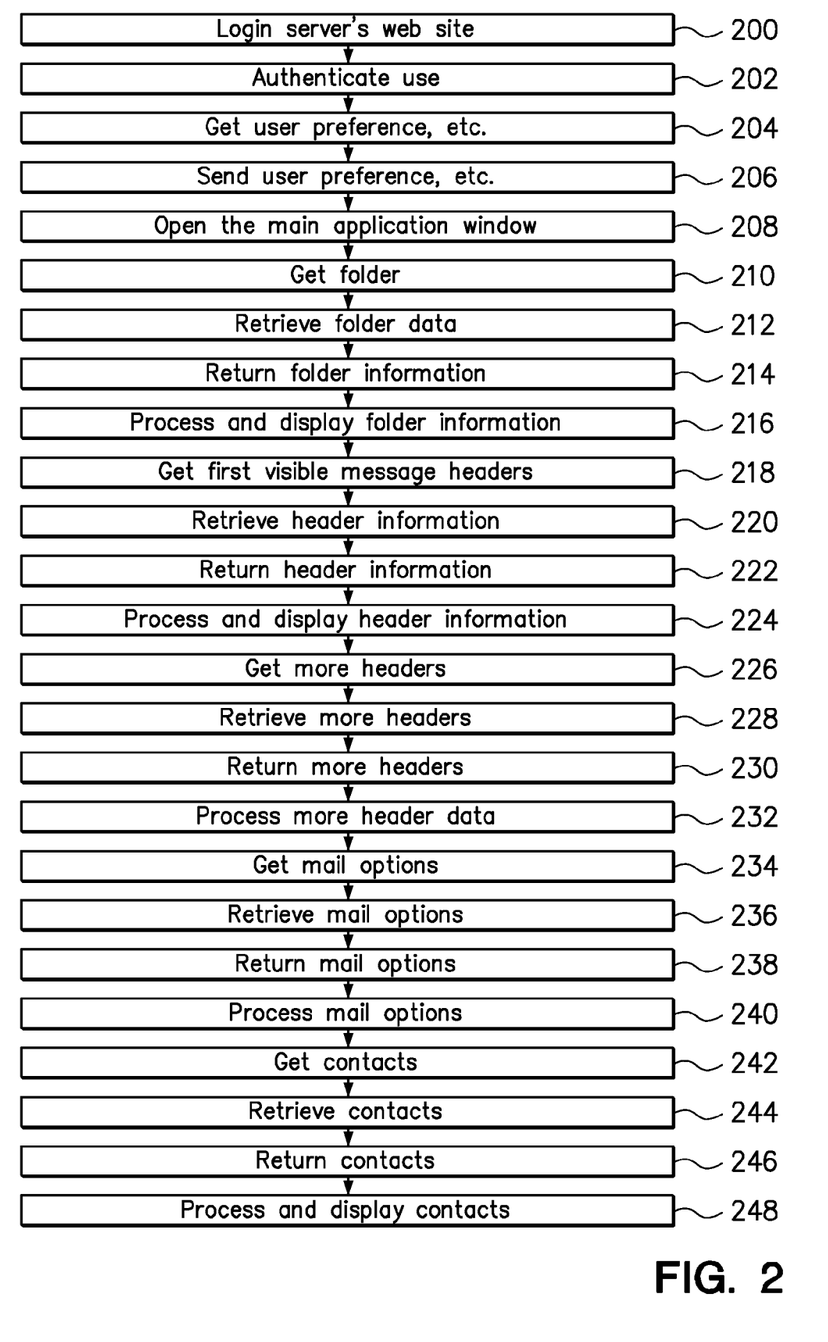
FIG. 2 is a flowchart illustrating the initialization process between a client and a server according to the present invention.

FIG. 2 is a flowchart illustrating the initialization process between a client and a server according to the present invention. In step 200, the user starts the browser and logs on to the server's web site. The log on process is commonly done by typing in a user name and a password. In step 202, the server verifies the user information. If a user is found, the server retrieves related user information from a database in step 204, and sends the information to the client in step 206. Examples of such user information include user preferences, window size, etc. Also downloaded to the user's computer in step 206 is the client mail program. In this embodiment, if the user has previously visited the site and a newer version of the code is not available, the client mail program does not need to be downloaded again.

In step 208, the client opens the main application window and sets the display based on the user information received. In step 210, the client issues a command to get folder information from the server. In one embodiment, the folder information includes folder names as well as message headers in each folder. In step 212, the folder data is retrieved from the database by the server, and returned to the client in step 214. In step 216, the client processes and displays the folder information retrieved.

In one embodiment, the message headers are displayed after folder information is retrieved. Since there is limited space on the user's display for showing the message headers, only the messages that are on top of the list are visible to the user and need to be displayed initially. The rest of the message headers are retrieved asynchronously at a later stage and stored in the client's data structures, so that they can be displayed when the user wishes to view more message headers. Retrieving just the headers visible to the user first reduces the amount of data transferred from the server initially, and decreases the latency the user experiences. In step 218, the client makes an asynchronous request to the server to get the first set of visible message headers. In step 220, the server retrieves the visible message header information requested and returns the information to the client in step 222. In step 224, the header information is processed and displayed on the client. In step 226, the client issues a command to the server to get more headers. In step 228, the server retrieves more headers from its database and returns the header information in step 230. In step 232, the header information is processed and stored in the client's data structure.

In step 234, the client issues a request to get mail options. In step 236, the server retrieves the mail options from its database and returns the mail options to the client in step 238. In step 240, the client processes the mail option. In step 242, the client issues a command to the server to get contacts. The server retrieves contacts from the database in step 244 and returns the contacts in step 246. In step 248, the contact information is processed and displayed accordingly.

The steps described above occur in different order in some embodiments. Also, the steps can take place either synchronously or asynchronously. In some embodiments, after the user is logged on and the user preference is downloaded, most of the client-server communication takes place asynchronously. After the user performs an action, the selected parts of the user interface on the client are updated immediately. The client program sends the corresponding commands to the server, and the user is not blocked from further interactions with the client program. Generally, once the server sends a response back to the client, the user interface does not need to be updated again.

For example, while the client is making a request to get contacts, rather than waiting for the response and blocking other operations, the client waits for the server response in the background in an asynchronous manner, and the user can carry out other tasks. Once the server response is received, a callback function is used to carry out the appropriate operation to process the response. Similarly, the client supports asynchronous tasks such as sorting email messages, managing folders, drag-and-drop of messages and contacts, automatic completion of email addresses through address book lookup and email message previews, etc. The client updates selected portions of the user interface once the user performs a task, and sends the information related to the task to the server asynchronously. Since the client does not wait for the server response to update its user interface, it appears to be more responsive and have lower latency.

Figure 3:
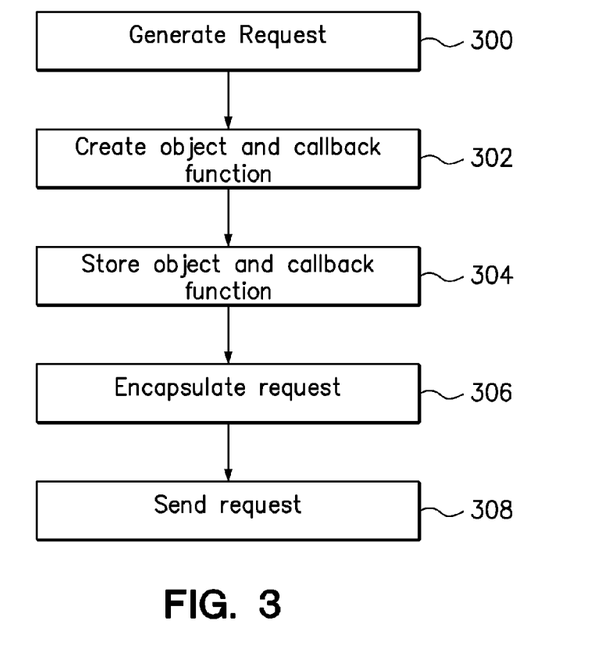
FIG. 3 is a flowchart illustrating the process by which the session manager sends a request, in an embodiment according to present invention.

In one embodiment, the session manager 112 is used to handle communication between the client and the server. The session manager is implemented to support asynchronous operations. FIG. 3 is a flowchart illustrating the process by which the session manager sends a request, in an embodiment according to present invention. In step 300, a request is generated. In step 302, the session manager creates a session object to track context information related to the interaction. The session object is associated with a callback function, which is invoked once the response is returned from the server. In step 304, the session object and the callback function are stored in the client's data structures. In step 306, the request is encapsulated into a predefined format. In step 308, the request is sent to the server.

Figure 4:
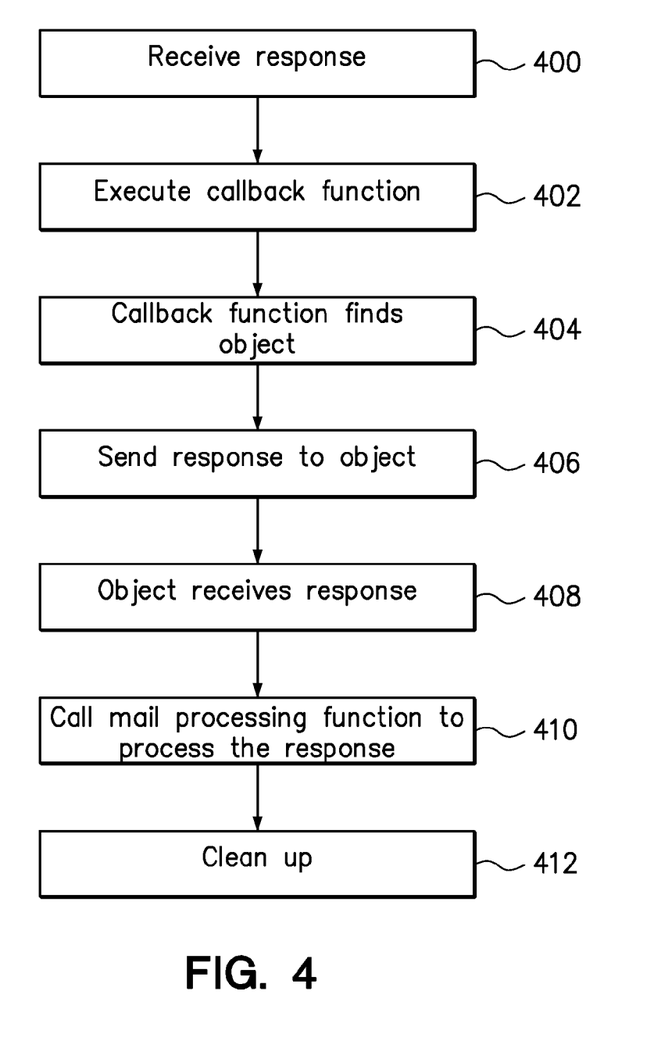
FIG. 4 is a flowchart illustrating how the session manager handles the response, in an embodiment according to present invention.

Once the request is sent, the client allows the user to carry out other operations while waiting for the response to return. FIG. 4 is a flowchart illustrating how the session manager handles the response, in an embodiment according to present invention. In step 400, the response from the server is received. In step 402, the callback function associated with the response is invoked. The session object associated with the callback function is found in step 404. In step 406, the data in the response is passed on to the session object. In step 410, the corresponding mail processing function associated with the session object is invoked to process the response data. In step 412, the response handling is done and resources used in the process are cleaned up.

The data transferred between the client and the server can be in different formats depending on the requirements of the system. In one embodiment, the data is encapsulated in extensible markup language (XML), which allows the application developers to organize data in hierarchical form and transfers the data in a text encoded format. Both the client and the server include code capable of transforming internal data structures to XML and vice versa. In one embodiment, the client and the server use Simple Object Access Protocol (SOAP) for data encapsulation. Table 1 is a sample XML document that describes information regarding mail folders. A pair of key words surrounded by brackets (<>) forms a data node, which encodes some information. A node may have children, i.e., other nodes that are at a lower hierarchical level, as well as attributes describing the node.

TABLE 1

```
<folders>
    <folder name = "inbox">
        <messages>
            <message>
                <to name = "Ethan" addr = "ethan@olddpost.com"/>
                <from name = "Iain" addr = "iain@oddpost.com"/>
                <body> hello, there! </body>
            </message>
        </messages>
    </folder>
    <folder name = "outbox"/>
</folders>
```

In some embodiments, on the server side, the mail protocol server requires inputs in a specific format or protocol. For example, an IMAP server receives inputs based on IMAP. The server translates a request from the client to IMAP, or, as it is done in a preferred embodiment, the client formats its request in IMAP, encapsulates the IMAP data in XML, and then sends the data to the server. The server receives the request, extracts the IMAP data from the XML request, and passes on the IMAP commands to the IMAP server. Formatting the commands on the client side reduces the server load.

In one embodiment, the communication between the client and the server is stateful, where the server tracks the user's state from the time he logs on. In one embodiment, the communication between the client and the server is stateless, where the server does not know about the user's state. The client sends authentication information to the server with every request. The stateless implementation reduces the complexity on the server, as it does not need to track any state information.

Figure 5:
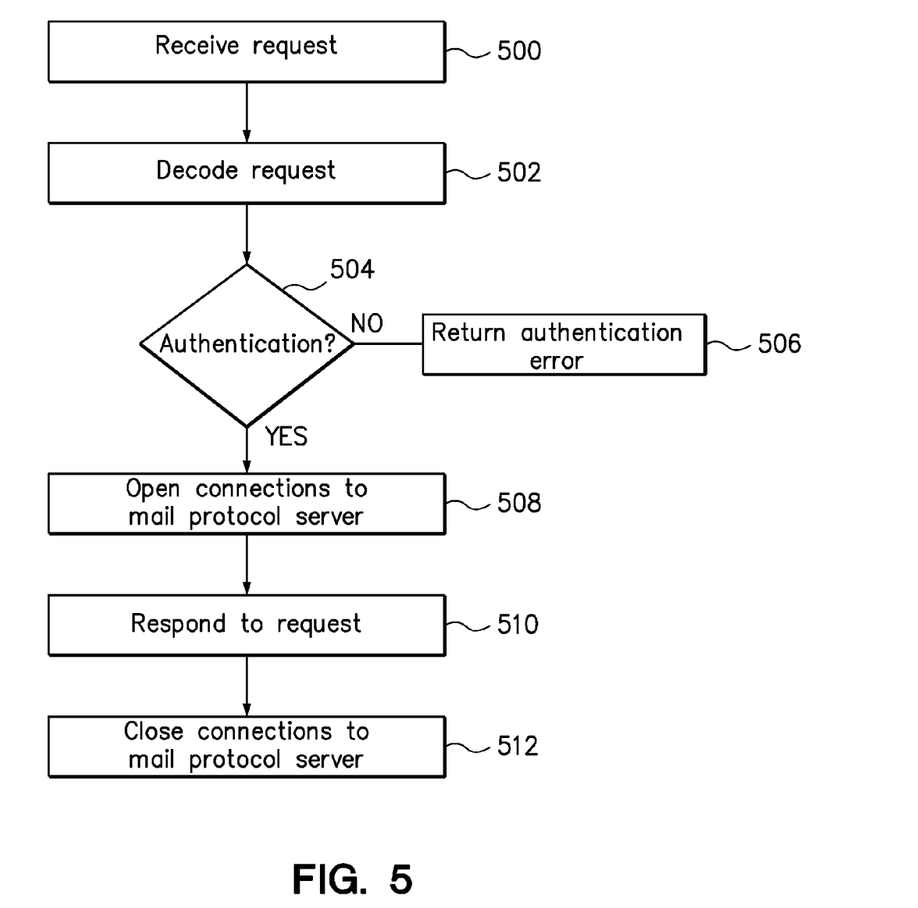
FIG. 5 is a flowchart illustrating how the server handles a request coming from the client.

FIG. 5 is a flowchart illustrating how the server handles a request coming from the client. In step 500 the server receives a request from the client. In step 502, the request is decoded. For instance, an XML formatted message may be transformed to the server's own data structures. In step 504, the authentication information embedded in the request is extracted and used to authenticate the user. If the user is not authenticated, an error is returned in step 506. If the user is authenticated, the server opens a connection to a mail protocol server in step 508, and carries out the client request in step 510. In step 512, the communication with the mail protocol server is complete and the connection to the mail protocol server is closed.

Figure 6:
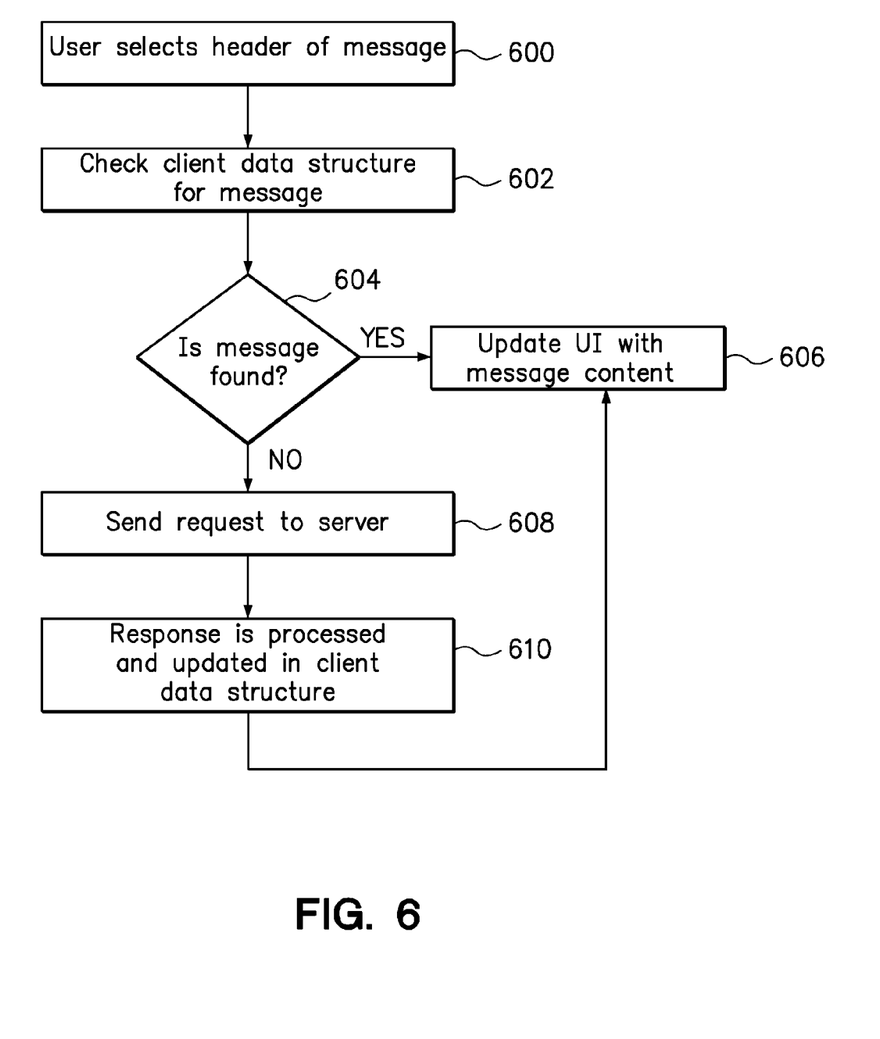
FIG. 6 illustrates the process for displaying the content of a message.

FIG. 6 illustrates the process for displaying the content of a message. In step 600, the user selects the header of a message he wishes to view. In step 602, the client checks in its data structures for the selected message. In step 604, the client determines whether the message content (aka: body) is cached in its local data structures. If the message content is cached in the client's local data structures, the message content has already been downloaded onto the client, and control is transferred to step 606 to update the user interface with the message content. If, however, the message content is not cached in the client's local data structures, control is transferred to step 608 where the request is sent to the server. In step 610, the server response with the message content is processed, and the data structures on the client side are updated using the response. The client continues on to step 606 where the user interface is updated accordingly.

Figure 7:
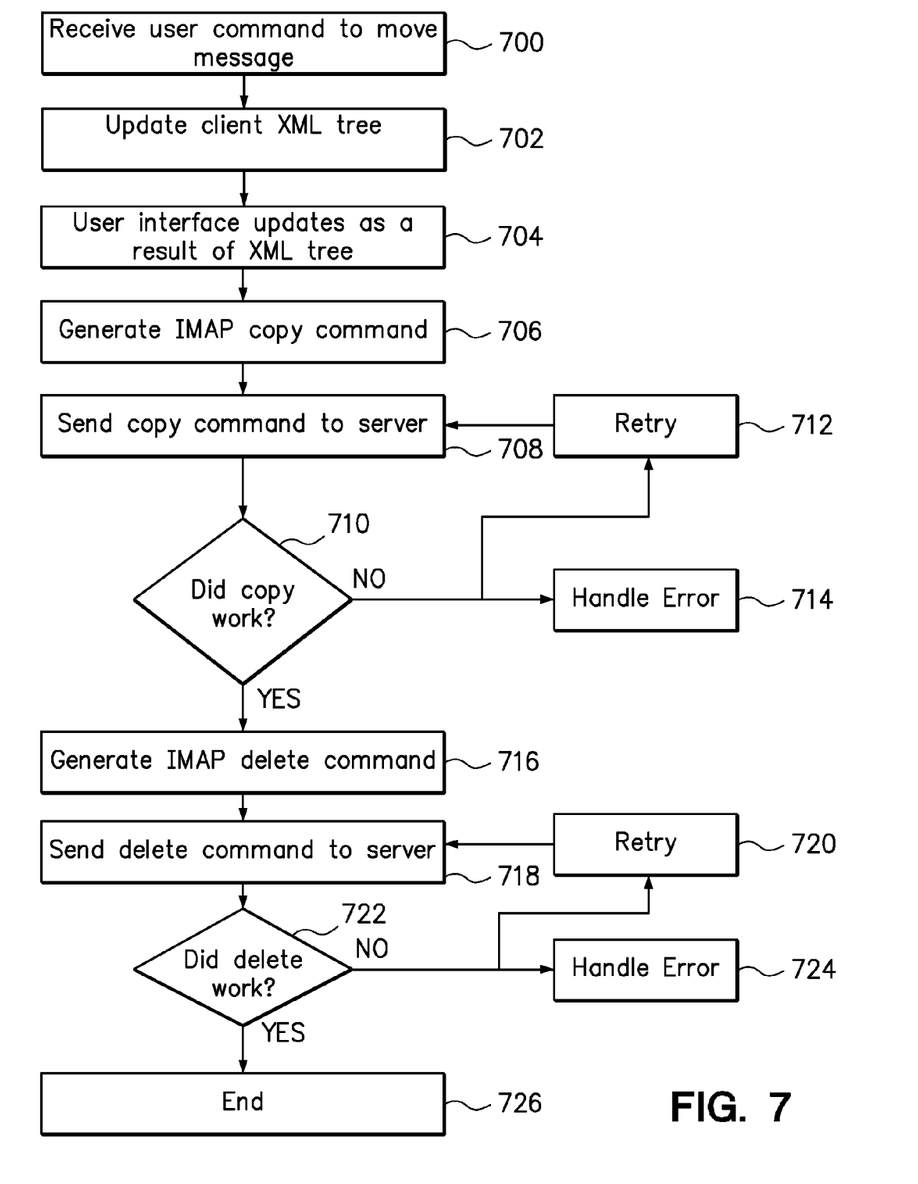
FIG. 7 illustrates the process for moving a message.

To provide good performance, the system updates the client side display based on user input first, and then sends information to the server for command execution and data synchronization. The client handles any error that may occur in the process. An example of synchronization and error handling is shown in FIG. 7, which illustrates the process for moving a message from one folder to another. A message is first copied to the desired location and then deleted from its original location. In step 700, the client receives a user command to move a message. In step 702, the client data structure, in this case an XML data tree, is updated based on the information received. In step 704, the user interface is updated as a result of the XML tree update. In step 706, a copy command that conforms to the mail protocol used by the mail protocol server, in this case IMAP, is created. The copy command is sent to the server in step 708.

In step 710, the client determines whether the copy command worked based on the server response. If the copy command failed, control may be transferred to step 714 to handle the error, or to step 712 where the client retries and sends the copy command to the server again in step 708. In this embodiment, error handling includes displaying error messages for the user, restoring client data structures and display, etc. If after a certain number of retries, the copy command still has not succeeded on the server side, control is eventually transferred to step 714 and the error is handled appropriately.

If the copy command succeeded, control is transferred to step 716 where a delete command that conforms to the mail protocol used by the mail protocol server, in this case IMAP, is issued. The delete command is sent to the server in step 718. In step 722, the client determines whether the delete command worked based on the server response. If the delete command failed, control may be transferred to step 724 to handle the error, or to step 720 where the client retries and sends the delete command to the server again in step 718. If the delete command still has not succeeded on the server after a number of retries, control is eventually transferred to step 724 and the error is handled. If delete succeeded, the move operation finishes at step 726.

A system and method for high performance email over a network has been disclosed. The system uses a "smart client" model to allow for client side data processing, and perform more complex mail related tasks on the client side. The system employs an asynchronous communication protocol between the client and the server to reduce latency, provide good response time and minimize the amount of request/response traffic between the client and the server.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of interacting with mail data on a server comprising:
   at a client, receiving the mail data from the server;
   at the client, receiving user input that performs a change that requires an operation to be performed on the server;
   in response to the user input, perform the following steps on the client:
      generating a request for the operation to be performed on the server;
      generating a data structure that includes a call back function that is to be invoked in response to receiving from the server a response to the request; and
      sending the request to the server;
   wherein the client does not block while waiting for the response from the server to the request, thereby allowing one or more operations to be performed at the client after the client sends the request and before the client receives the response to the request;
   receiving from the server the response to the request; and
   in response to receiving the response, invoking the call back function contained in the data structure that was generated upon the user input.

2. A method of interacting with mail data on a server as recited in claim 1 wherein the client operates on the mail information via a browser.

3. A method of interacting with mail data on a server as recited in claim 1 wherein the client operates on the mail data via a browser, using a programming language that allows for client side modification of mail data received.

4. A method of interacting with mail data on a server as recited in claim 1 wherein the client operates on the mail data via a browser, using Dynamic Hypertext Markup Language (DHTML).

5. A method of interacting with mail data on a server as recited in claim 1 wherein the mail data is in Extensible Markup Language (XML) format.

6. A method of interacting with mail data on a server as recited in claim 1 wherein the mail data is in Extensible Markup Language (XML) format and is encapsulated using simple object access protocol (SOAP).

7. A method of interacting with mail data on a server as recited in claim 1 wherein the request sent to the server comprises IMAP commands.

8. A method of interacting with mail data on a server as recited in claim 1 wherein the request sent to the server comprises IMAP commands that are in XML format and are encapsulated using SOAP.

9. An electronic mail system comprising:
   a server that sends mail data; and
   a client connected to the server;
   wherein
      the client is configured to receive the mail data from the server;
      the client is configured to receive user input that performs a change that requires an operation to be performed on the server;
      the client is configured to respond to the user input by:
         generating a request for the operation to be performed on the server;
         generating a data structure that includes a call back function that is to be invoked in response to receiving from the server a response to the request; and
         sending the request to the server;
      wherein the client does not block while waiting for a response from the server to the request, thereby allowing one or more operations to be performed at the client after the client sends the request and before the client receives the response to the request;
      the client is configured to respond to receiving from the server the response to the request by invoking the call back function contained in the data structure that was generated upon the user input.

10. A non-transitory computer readable medium comprising computer instructions for:
    at a client, receiving the mail data from the server;

at the client, receiving user input that performs a change that requires an operation to be performed on the server;

in response to the user input, perform the following steps on the client:

generating a request for the operation to be performed on the server;

generating a data structure that includes a call back function that is to be invoked in response to receiving from the server a response to the request; and sending the request to the server;

wherein the client does not block while waiting for a response from the server to the request, thereby allowing one or more operations to be performed at the client after the client sends the request and before the client receives the response to the request;

receiving from the server the response to the request; and in response to receiving the response, invoking the call back function contained in the data structure that was generated upon the user input.

* * * * *

UNITED STATES PATENT AND TRADEMARK OFFICE
CERTIFICATE OF CORRECTION

PATENT NO. : 8,117,264 B1
APPLICATION NO. : 10/267004
DATED : February 14, 2012
INVENTOR(S) : Iain K. Lamb and Ethan H. Diamond

It is certified that error appears in the above-identified patent and that said Letters Patent is hereby corrected as shown below:

Delete the title page and substitute therefore the attached title page showing the corrected number of claims in patent.

Please insert the following claims:

--11. A non-transitory computer readable medium as recited in Claim 10 wherein the client operates on the mail information via a browser.
12. A non-transitory computer readable medium as recited in Claim 10 wherein the client operates on the mail data via a browser, using a programming language that allows for client side modification of mail data received.
13. A non-transitory computer readable medium as recited in Claim 10 wherein the client operates on the mail data via a browser, using Dynamic Hypertext Markup Language (DHTML).
14. A non-transitory computer readable medium as recited in Claim 10 wherein the mail data is in Extensible Markup Language (XML) format.
15. A non-transitory computer readable medium as recited in Claim 10 wherein the mail data is in Extensible Markup Language (XML) format and is encapsulated using simple object access protocol (SOAP).
16. A non-transitory computer readable medium as recited in Claim 10 wherein the request sent to the server comprises IMAP commands.
17. A non-transitory computer readable medium as recited in Claim 10 wherein the request sent to the server comprises IMAP commands that are in XML format and are encapsulated using SOAP.
18. An electronic mail system as recited in Claim 9 wherein the client operates on the mail information via a browser.
19. An electronic mail system as recited in Claim 9 wherein the client operates on the mail data via a browser, using a programming language that allows for client side modification of mail data received.
20. An electronic mail system as recited in Claim 9 wherein the client operates on the mail data via a browser, using Dynamic Hypertext Markup Language (DHTML).--

Signed and Sealed this
Twenty-seventh Day of March, 2012

David J. Kappos
*Director of the United States Patent and Trademark Office*

CERTIFICATE OF CORRECTION (continued)

(12) United States Patent
Lamb et al.

(10) Patent No.: US 8,117,264 B1
(45) Date of Patent: Feb. 14, 2012

(54) EMAIL SYSTEM

(75) Inventors: Iain K. Lamb, San Francisco, CA (US); Ethan H. Diamond, Berkeley, CA (US)

(73) Assignee: Yahoo! Inc., Sunnyvale, CA (US)

(*) Notice: Subject to any disclaimer, the term of this patent is extended or adjusted under 35 U.S.C. 154(b) by 2806 days.

(21) Appl. No.: 10/267,004

(22) Filed: Oct. 7, 2002

(51) Int. Cl.
*G06F 15/16* (2006.01)
(52) U.S. Cl. ........ 709/206; 709/203; 709/219; 719/318
(58) Field of Classification Search ............... 709/206
See application file for complete search history.

(56) References Cited

U.S. PATENT DOCUMENTS

| | | | |
|---|---|---|---|
| 6,460,058 B2 * | 10/2002 | Koppolu et al. | 715/738 |
| 6,658,453 B1 * | 12/2003 | Dattatri | 709/202 |
| 6,944,555 B2 * | 9/2005 | Blackett et al. | 702/62 |
| 7,162,723 B2 * | 1/2007 | Guthrie et al. | 719/318 |
| 7,802,264 B2 * | 9/2010 | Robertson et al. | 709/215 |
| 2002/0120685 A1 * | 8/2002 | Srivastava et al. | 709/203 |
| 2002/0129096 A1 * | 9/2002 | Mansour et al. | 709/203 |
| 2002/0174260 A1 * | 11/2002 | Huang | 709/313 |
| 2003/0172118 A1 * | 9/2003 | Bilansky et al. | 709/206 |
| 2007/0016639 A1 * | 1/2007 | Mukundan et al. | 709/203 |
| 2008/0216094 A1 * | 9/2008 | Anderson et al. | 719/318 |

OTHER PUBLICATIONS

IETF RFC RFC 2060—IMAP Ver4Rev1, Dec. 1996, M. Crispin, University of Washington.*

* cited by examiner

*Primary Examiner* — Greg C Bengzon
(74) *Attorney, Agent, or Firm* — Hickman Palermo Truong & Becker LLP (57) ABSTRACT

A system and method are disclosed for providing interaction with mail data on a server. Providing interaction with mail data on a server comprises receiving mail information from the server; updating data structures in a client using the mail information received; operating on the mail information at the client and displaying operation results on the client; sending operation information to the server so that the same operation may be executed on the server.

20 Claims, 7 Drawing Sheets